(12) United States Patent
Miyagoshi et al.

(10) Patent No.: US 6,996,122 B1
(45) Date of Patent: Feb. 7, 2006

(54) METHOD AND APPARATUS FOR DECODING

(75) Inventors: Eiji Miyagoshi, Osaka (JP); Akihiro Watabe, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/743,143

(22) PCT Filed: Jul. 13, 1999

(86) PCT No.: PCT/JP99/03766

§ 371 (c)(1),
(2), (4) Date: Mar. 5, 2001

(87) PCT Pub. No.: WO00/04543

PCT Pub. Date: Jan. 27, 2000

(30) Foreign Application Priority Data

Jul. 15, 1998 (JP) ................................ 10-200996

(51) Int. Cl.
*H04J 3/16* (2006.01)

(52) U.S. Cl. ........................................ 370/465; 386/68

(58) Field of Classification Search ................ 370/252, 370/465, 470, 471, 473, 487, 389; 386/109, 386/110, 126, 68–70, 81, 124, 111–112; 375/240.01

See application file for complete search history.

(56) References Cited

U.S. PATENT DOCUMENTS 5,535,008 A * 7/1996 Yamagishi et al. ......... 386/109
5,596,564 A * 1/1997 Fukushima et al. ........... 386/70
5,686,965 A * 11/1997 Auld ...................... 375/240.01
5,991,503 A * 11/1999 Miyasaka et al. ............ 386/111

FOREIGN PATENT DOCUMENTS

| JP | 08-181944 | 7/1996 |
|----|-----------|--------|
| JP | 08-228323 | 9/1996 |
| JP | 09-098430 | 4/1997 |
| JP | 10-261075 | 9/1998 |
| JP | 11-018051 | 1/1999 |

OTHER PUBLICATIONS

Japanese Office Action dated Mar. 15, 2004 for Application No. 2000-560579.

* cited by examiner

*Primary Examiner*—Chau Nguyen
*Assistant Examiner*—Robert W. Wilson
(74) *Attorney, Agent, or Firm*—Renner, Otto, Boisselle & Sklar, LLP

(57) ABSTRACT

A decoding device 1 decodes a bit stream including a plurality of packets. Data corresponding to an access unit includes a first data portion 150a-1 and a second data portion 150a-2. The decoding device 1 includes a packet regeneration section 10 for receiving a first packet 130 and a second packet 130 following the first packet 130, and when the first packet 130 includes the first data portion 150a-1 and the second packet 130 includes the second data portion 150a-2, producing a new packet 164 including the data corresponding to the access unit by combining the first data portion 150a-1 and the second data portion 150a-2. The decoding device 1 also includes a decoding section 40 for decoding the data corresponding to the access unit. The new packet 164 includes information indicating a length of the data corresponding to the access unit.

6 Claims, 9 Drawing Sheets

FIG. 6A

Syntax of pack header 120

```
Pack() {
    pack_start_code
    '0010'
    system_clock_reference[32:30]
    marker_bit
    system_clock_reference[29:15]
    marker_bit
    system_clock_reference[14:0]
    marker_bit
    marker_bit
    mux_rate
    marker_bit
}
```

Example of bit array of pack header 120

Example of bit array of PES header 140

0000 0000 0000 0000 0000 0001
1110 0000
0000 0000 1111 1111

Syntax of PES header 140

```
Packet() {
    pack_start_code_prefix
    stream_id
    packet_length
    for(I=0; i<N; I++) {
        packet_data_byte
    }
}
```

METHOD AND APPARATUS FOR DECODING

TECHNICAL FIELD

The present invention relates to a decoding device and a decoding method for decoding a bit stream including a plurality of packets.

BACKGROUND ART

A decoding device for decoding a bit stream including a plurality of packets is known. Each of the plurality of packets includes a header portion and a data portion. A picture start code indicating a leading position of an access unit is located at an arbitrary position in the data portion.

A skip reproduction operation and a freeze reproduction operation are known as special reproduction operations of video data and audio data. A skip reproduction operation is implemented by skipping at least one of a plurality of access units. A freeze reproduction operation is implemented by repeatedly reproducing at least one of the plurality of access units.

It is necessary to specify the leading position of the access unit for implementing the skip reproduction operation. For this purpose, the conventional decoding device is required to detect the picture start code included in the data portion of a packet by searching the data portion of the packet. However, searching the data portion of the packet is time-consuming. Therefore, it is difficult to perform the skip reproduction operation smoothly.

The conventional decoding device performs the freeze reproduction operation by accumulating the bit stream to a buffer memory first and then repeatedly reading specific data included in the bit stream which is accumulated in the buffer memory. Therefore, the conventional decoding device needs a large capacity buffer memory for display.

The present invention has objectives of: (1) providing a decoding device and a decoding method implementing a fast skip reproduction operation: and (2) providing a decoding device and a decoding method which eliminates the necessity of a buffer memory for display.

DISCLOSURE OF THE INVENTION

A decoding device according to the present invention is a decoding device for decoding a bit stream including a plurality of packets. In which data corresponding to an access unit includes a first data portion and a second data portion, the decoding device including: a packet regeneration section for receiving a first packet and a second packet following the first packet, and when the first packet includes the first data portion and the second packet includes the second data portion, producing a new packet including the data corresponding to the access unit by combining the first data portion and the second data portion; and a decoding section for decoding the data corresponding to the access unit, wherein the new packet includes information indicating a length of the data corresponding to the access unit. Thus, the above-described objectives are achieved.

The new packet may further include information indicating a presentation time stamp.

The packet regeneration section may generate a plurality of now packets, and the decoding device may further include a storage section for storing the plurality of new packets generated by the packet regeneration section; and a read control section for controlling a reading operation of the plurality of new packets from the storage section so as to skip at least one of the plurality of new packets by using the information indicating the length of the data corresponding to the access unit.

The packet regeneration section may generate a plurality of new packets, and the decoding device may further includes a storage section for storing the plurality of new packets generated by the packet regeneration section; and a read control section for controlling a reading operation of the plurality of new packets from the storage section so as to repeatedly read at least one of the plurality of new packets by using the information indicating the length of the data corresponding to the access unit.

A decoding method according to the present invention is a decoding method for decoding a bit stream including a plurality of packets, in which data corresponding to an access unit includes a first data portion and a second data portion, the decoding method including the steps of: receiving a first packet and a second packet following the first packet, and when the first packet includes the first data portion and the second packet includes the second data portion, producing a new packet including the data corresponding to the access unit by combining the first data portion and the second data portion; and decoding the data corresponding to the access unit, wherein the new packet includes information indicating a length of the data corresponding to the access unit. Thus, the above-described objectives are achieved.

BRIEF DESCRIPTION OF THE DRAWINGS

FIG. 6A illustrates an example of a syntax and a bit array of a pack header 120.

FIG. 6B illustrates an example of a syntax and a bit array of a PES header 140.

BEST MODE FOR CARRYING OUT THE INVENTION

Hereinafter, examples of the present invention will be described with reference to the figures.

Figure 1:
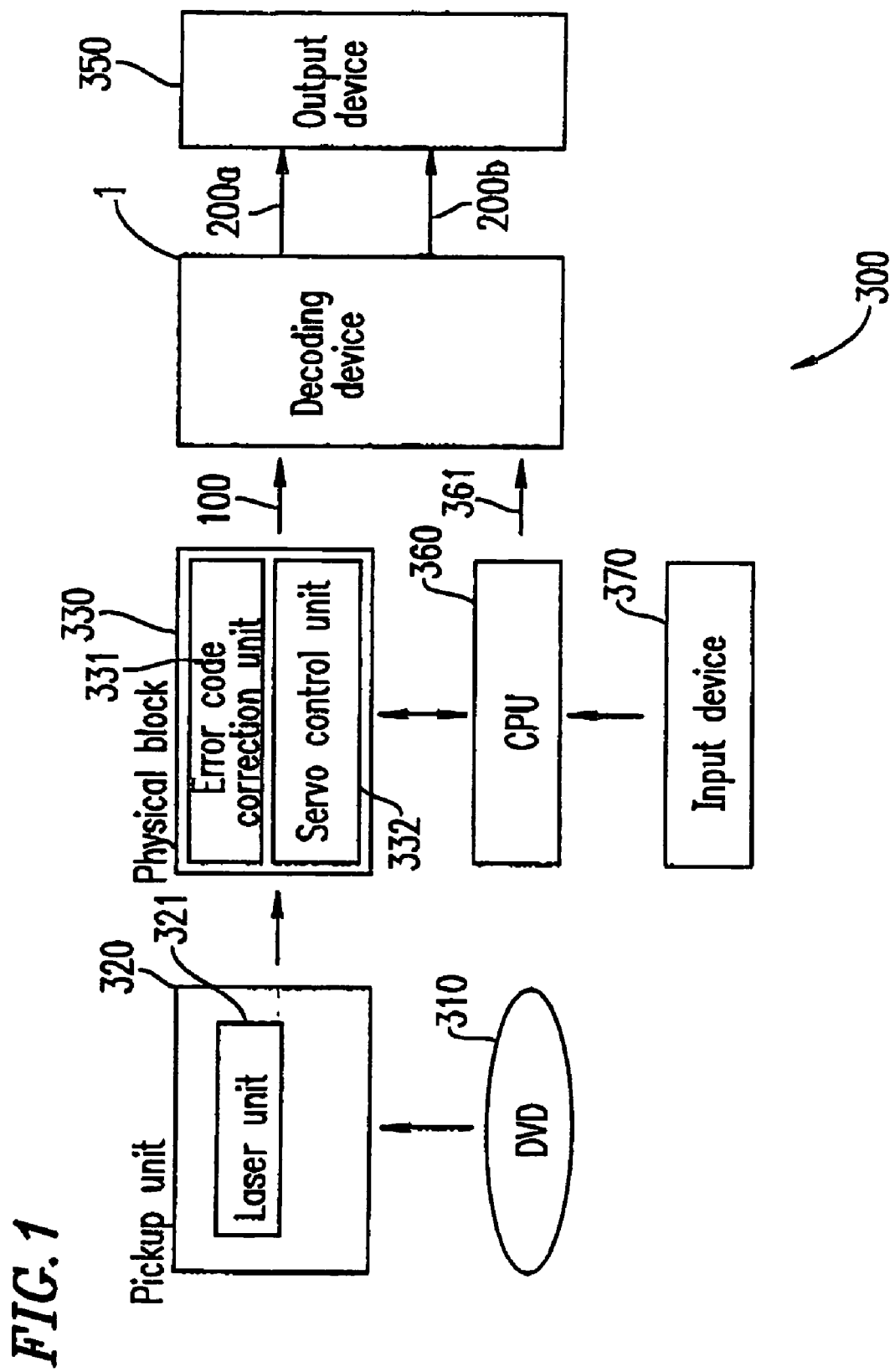
FIG. 1 illustrates an exemplary structure of a DVD reproduction apparatus 300 including a decoding device 1 according to the present invention.

FIG. 1 shows an exemplary structure of a DVD reproduction apparatus 300 including a decoding device 1 according to the present invention.

The DVD reproduction apparatus 300 includes a pickup unit 320, a physical block 330, the decoding device 1, an output device 350, a CPU 360, and an input device 370.

A DVD 310 has video data and audio data recorded thereon. The data recorded on the DVD 310 is read and reproduced by the DVD reproduction apparatus 300. The disk 310 is described as a DVD in this specification, but can be any other information recording medium.

The pickup unit 320 reads data recorded on the DVD 310. Data is read by irradiating the DVD 310 with laser light having a prescribed wavelength from a laser unit 321 and detecting the laser light reflected by the DVD 310. The pickup unit 320 outputs the read data to the physical block 330.

The physical block 330 includes an error code correction unit 331 and a servo control unit 332. The physical block 330 receives data output from the pickup unit 320. The received data is subjected to signal processing, such as, for example, error code correction by the error code correction unit 331. The physical block 330 outputs the processed data to the decoding device 1 as a bit stream 100.

The decoding device 1 receives the bit stream 100 which has been output from the physical block 330. The decoding device 1 receives a control signal 361 which indicates a reproduction operating mode from the central processing unit (CPU) 360. The decoding device 1 carries out a decoding process of the bit stream 100 according to the reproduction operating mode indicated by the control signal 361. The decoding device 1 outputs a video signal 200a and/or an audio signal 200b to the output device 350 as a decoded result of the bit stream 100.

Details of a structure and operation of the decoding device 1 will be described later.

The output device 350 displays the video signal 200a which has been output from the decoding device 1 on a display, such as, a television for example, and outputs the audio signal 200b which has been output from the decoding device 1 to a speaker. The data is thus output from the decoding device 1 in a format in which the data can be output to the display or the speaker.

The central processing unit (CPU) 360 controls the pickup unit 320, the physical block 330, the decoding device 1, and the output device 350. When a command indicating the reproduction operating mode (e.g., normal reproduction mode, double speed reproduction made, freeze reproduction mode) is input from the input device 370, the CPU 360 generates the control signal 361 corresponding to the command and outputs the control signal 361 to the decoding device 1.

The input device 370 is used for allowing a user to input the command indicating the reproduction operating mode. Such a command is input by using, for example, a remote controller (not shown) or an operation panel (not shown) provided in the DVD reproduction apparatus 300.

In the example described above, it is assumed that the bit stream 100 to be input to the decoding device 1 is data which has been read from the DVD 310 and has been processed. However, the bit stream data 100 can be data obtained from an accumulation medium or a broadcasting medium. Herein, an accumulation medium can be, for example, a CD-ROM, an LD, or a video tape, and a broadcasting medium can be, for example, television broadcasting, satellite broadcasting, or data communication.

Hereinafter, a structure of the bit stream 100 to be input to the decoding device 1 will be described.

Figure 2A:
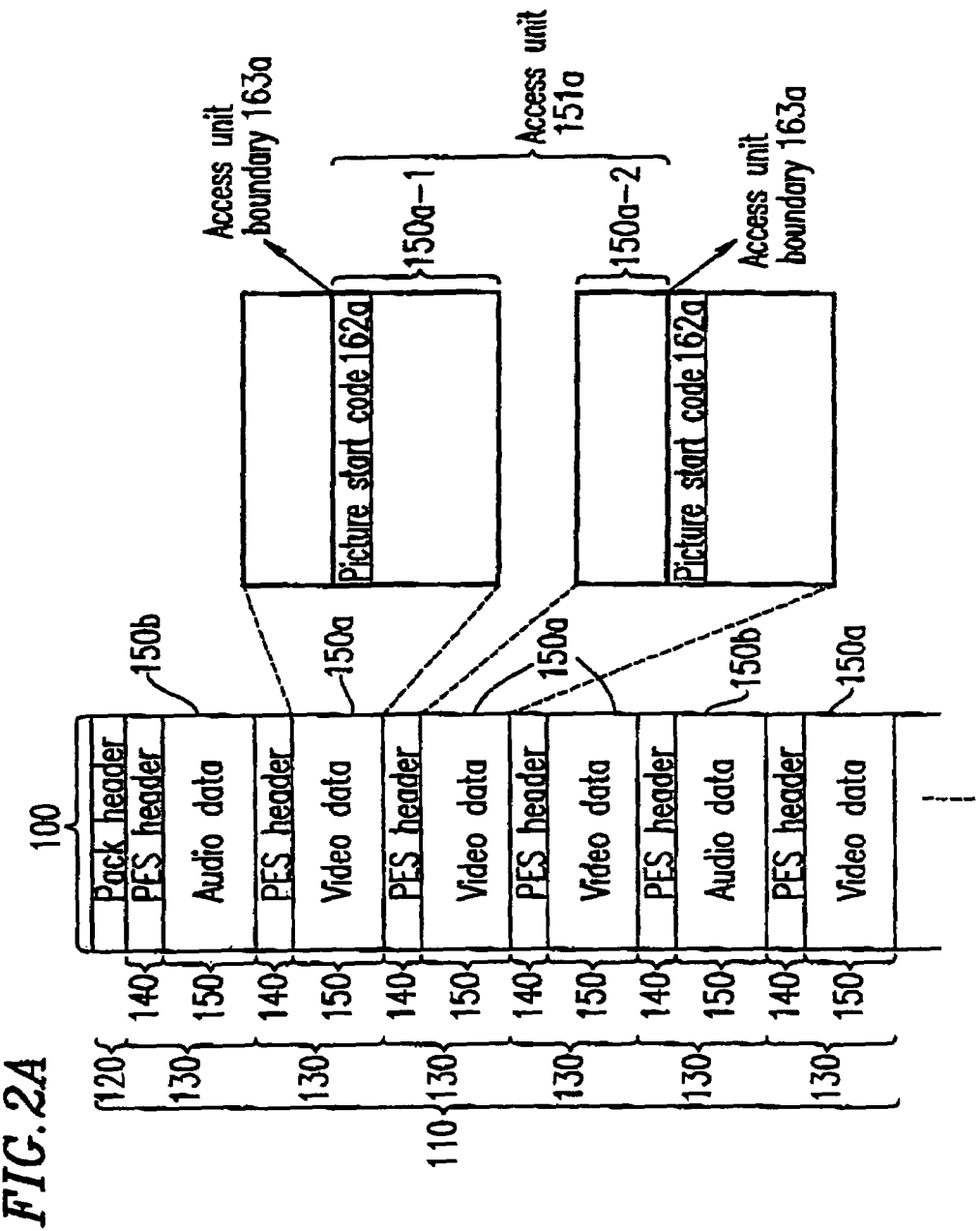
FIG. 2A schematically illustrates a structure of a bit stream 100.

FIG. 2A schematically illustrates the structure of the bit stream 100.

The bit stream 100 illustrated in FIG. 2A is in conformity with the MPEG2 standard. However, the bit stream 100 to be input to the decoding device 1 is not limited to a stream in conformity with the MPEG2 standard. Any bit stream which includes data corresponding to an access unit described below can be input to the decoding device 1.

The bit stream 100 includes at least one pack 110. The pack 110 includes a pack header 120 and at least one packet 130. The packet 130 includes a PES header 140 and a data portion 150.

In the data portion 150, either video data 150a or audio data 150b is stored. In a DVD, a data length of the data portion 150 is fixed. However, in an MPEG data stream, a data length of the data portion 150 does not need to be a fixed length.

The video data 150a includes not only data of a main video but also data of a sub-video. Herein, main video refers to major video included in movies or television broadcasting, and sub-video refers to video representing additional information to the main video data, such as language subtitles or a title.

The audio data 150b corresponds to the video represented by the video data 150a, or is independent from the video represented by the video data 150a.

As shown in FIG. 2A, a picture start code 162a defines a boundary between an access unit and the next access unit (an access unit boundary 163a). Herein, the term "access unit" is defined as a smallest data unit which can be individually decoded. In the case of the video data 150a, an access unit can be one field or one frame.

Data corresponding to one access unit is not necessarily included in the data portion 150 of one packet 130. For example, as shown in FIG. 2A, there is a case where a portion of video data 150a corresponding to one access unit (a first data portion 150a-1) is included in a data portion 150 of a packet 130, and another portion of the video data 130a corresponding to the same access unit (a second data portion 150a-2) is included in a data portion 150 of another packet 130. In this case, the decoding device 1 according to the present invention generates video data 150A by combining the first data portion 150a-1 and the second data portion 150a-2, and generates a new packet 164 by combining the video data 150A and a PES header 141 (see FIG. 2B). The new packet 164 is thus generated to include data corresponding to one access unit.

In the case where data corresponding to one access unit is distributed in three or more packets, a new packet 164 is generated to include data corresponding to one access unit by combining data in these packets.

Alternatively, there may be a case where data corresponding to a plurality of access units are included in a data portion 150 of one packet 130. In this case, the decoding device 1 according to the present invention divides the data of the data portion 150 to correspond to the plurality of access units. Therefore, a plurality of new packets 164 are generated so that each packet includes data corresponding to one access unit.

FIG. 6A illustrates an example of a syntax and a bit array of the pack header 120.

The pack header 120 is identified by a value of pack_start_code. When the value of pack_start_code is 000001BA (hexadecimal), it is detected that the pack header 120 is in the bit stream 100. A typical example of the information provided in the pack header 120 is a system_clock_reference (SCR). An SCR is information indicating a reference time of a presentation timing of the video data 150a or the audio data 150b.

FIG. 6B illustrates an example of a syntax and a bit array of the PES header 140.

The PES header 140 is identified by a value of packet_start_code_prefix and a value of stream_id.

A field indicating packet_length and a field indicating packet_data_byte are provided in the PES header 140.

The packet_length field defines the number of bytes in the PES header 140 of this field and subsequent fields.

Information indicating a presentation time stamp (PTS) or the like may additionally be provided between the packet_length field and the packet_data_byte field. A PTS is information indicating a relative display time with respect to the reference time indicated by the SCR.

The packet_data_byte field represents the video data 150a or the audio data 150b. When the value of the stream_id is EX (hexadecimal; X is arbitrary), the packet_data_byte field represents the video data 150a.

Herein, the number of the bytes in the packet_length field and between the packet_length field and the packet_dat_byte field is predetermined by the syntax to be a fixed number of bytes. Thus, the value obtained by subtracting this fixed number of bytes from the number of bytes indicated by packet_length is equal to the number of bytes of the packet_dat_byte. The length of the video data 150a or the audio data 150b can be calculated by calculation based on packet_length. This enables extraction of the video data 150a or the audio data 150b from the bit stream 100.

Figure 3:
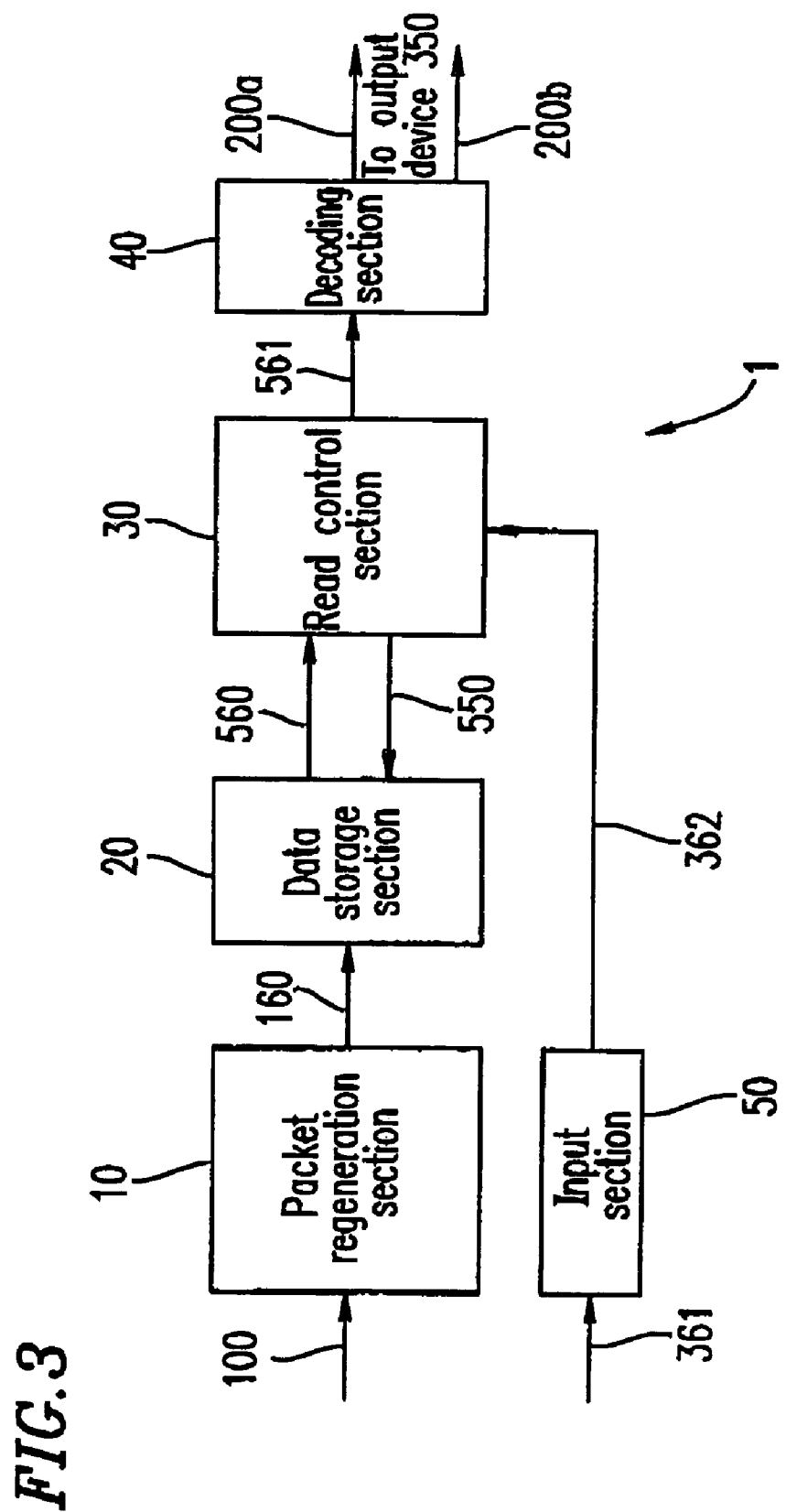
FIG. 3 illustrates a structure of the decoding device 1 according to an embodiment of the present invention.

FIG. 3 illustrates a structure of the decoding device 1 according to an embodiment of the present invention.

The decoding device 1 includes a packet regeneration section 10, a data storage section 20, a read control section 30, a decoding section 40, and an input section 50.

The packet regeneration section 10 receives the bit stream 100 and generates a bit stream 160 which is packed in access units. The generated bit stream 160 is output to the data storage section 20. A detailed structure and operation of the packet regeneration section 10 will be described later with reference to FIG. 4.

The data storage section 20 receives the bit stream 160 which is packed in access units from the packet regeneration section 10 and temporarily stores the received bit stream 160. The data storage section 20 also receives a read address signal 550, which indicates the location of the stored bit stream 160 which is packed in access units, from the read control section 30. The data storage section 20 reads the bit stream 160 from the location of the storage area corresponding to the address represented by the received read address signal 550, and outputs the read bit stream 160 to the read control section 30 as a data signal 560.

The data storage section 20 can be, for example, a DRAM.

The read control section 30 receives a control signal 362 which has been output from the input section 50. The control signal 362 is a signal indicating a reproduction operating mode of the bit stream 100. The read control section 30 generates the address signal 550 according to the reproduction operating mode indicated by the control signal 362, and outputs the generated address signal 550 to the data storage section 20. The read control section 30 receives the data signal 560 which has been output from the data storage section 20, and outputs the received data signal 560 to the decoding section 40 as a data signal 561. A detailed structure and operation of the read control section 30 will be described later with reference to FIG. 5.

The decoding section 40 receives the data signal 561 from the read control section 30, and decodes the received data signal 561. The decoding section 40 outputs the video signal 200a and/or the audio signal 200b which has been decoded from the data signal 561 to the output device 350 outside the decoding device 1.

Hereinafter, a structure and operation of the packet regeneration section 10 included in the decoding device 1 will be described.

Figure 4:
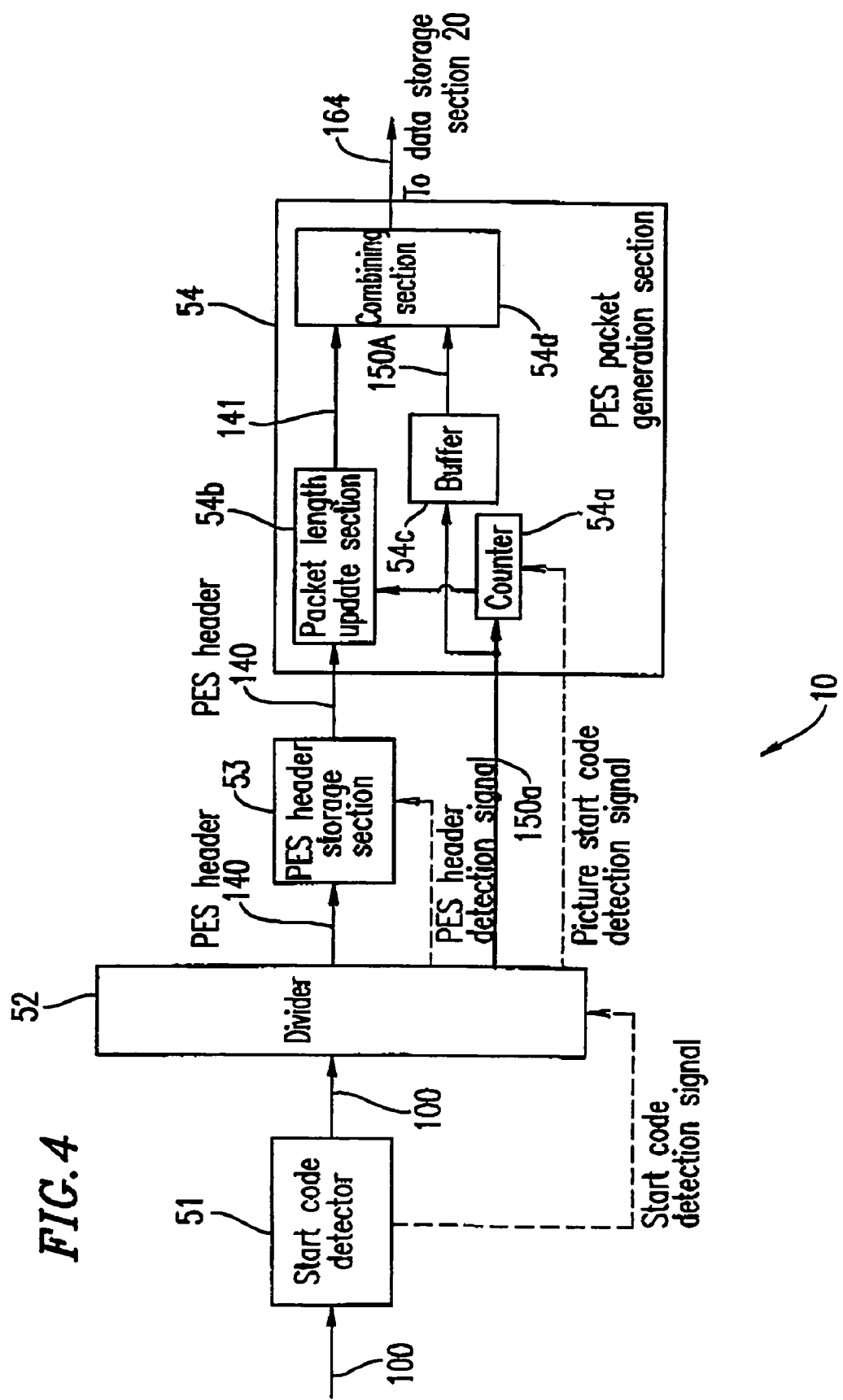
FIG. 4 illustrates a structure of a packet regeneration section 10.

FIG. 4 illustrates the structure of the packet regeneration section 10.

The packet regeneration section 10 includes a start code detector 51, a divider 52, a PES header storage section 53, and a PES packet generation section 54.

The start code detector 51 receives the bit stream 100 and detects a start code. The start code is a code inserted into a leading position of the pack header 120, a leading position of the PES header 140, and a leading position of an access unit 161a included in the bit stream 100. For example, the start code is a bit string of 24 bits, such as "0000 0000 0000 0000 0000 0001". The start code detector 51 outputs the received bit stream 100 to the divider 52. When the start code appears in the input bit stream 100, the start code detector 51 outputs a start code detection signal to the divider 52.

The divider 52 receives the bit stream 100 and the start code detection signal from the start code detector 51.

When the divider 52 receives the start code detection signal, the divider 52 reads data of a predetermined number of bits (for example, 8 bits) following the start code, and examines whether the data matches a predetermined bit string. As a result, the divider 52 determines the kind of data corresponding to the start code.

For example, when the 8 bits following the start code match "1110 XXXX", the divider 52 determines that the data is the PES header 140 corresponding to the video data 150a. When the 8 bits following the start code are "1100 XXXX", the divider 52 determines that the data is the PES header 140 corresponding to the audio data 150b. A synchronous word which is referred to as Sync byte may be used for determining the boundary between the access units in the audio data 150b. In this case, the device may be arranged so that the synchronous word is detected in the start code detector 51.

When the divider 52 detects the PES header 140 in the bit stream 100, the divider 52 outputs a PES header detection signal to the PES header storage section 53. Thus, the PES header 140 extracted from the bit stream 100 is stored in the PES header storage section 53.

The syntax of the pack header 120 and the PES header 140 are as illustrated in FIGS. 6A and 6B respectively. According to the respective syntax, the pack header 120 and the PES header 140 are extracted from the bit stream 100.

Hereinafter, an example in which the video data 150a is stored in the data portion 150 of the packet 130 will be described. However, this is merely an example, and the data to which the present invention is applicable is not limited to the video data 150a. The present invention can be applied to any data which can become a target of a special reproduction. For example, the video data 150a, the audio data 150b, and other kinds of data can be a target of the special reproduction.

When the video data 150a following the PES header 140 is input to the start code detector 51, the start code detector 51 detects the start code. For example, in the case where the 8 bits following the start code are "0000 0000", the divider 52 determines that the data is the picture start code 162a, and outputs a picture start code detection signal to the PES packet generation section 54.

The PES header storage section 53 stores the PES header 140 extracted from the bit stream 100 by the divider 52. A PES header detection signal from the divider 52 is used as an enable signal which permits the storage of the PES header 140 in the PES header storage section 53.

The PES header storage section 53 may alternatively store only a portion of the data of the PES header 140 (for example, packet_length, or packet_length and PTS) instead of storing the entire data of the PES header 140.

The PES packet generation section 54 receives the picture start code detection signal from the divider 52. A counter 54*a* initializes a count value in response to the picture start code detection signal. The count value represents the number of bytes of the video data 150*a* which are input to the counter 54A from the point of receiving a certain picture start code detection signal to the point of receiving the next picture start code detection signal. Thus, the counter 54*a* is used for counting the number of bytes from the leading position of an access unit to the leading position of the next access unit (i.e. a length of the access unit).

The PES packet generation section 54 additionally receives the PES header 140 stored in the PES header storage section 53. The PES header 140 in stored in a packet length update section 54*b*. In the packet length update section 54*b*, the value of packet_length of the PES header 140 is updated so as to match the length of the access unit counted by the counter 54*a*. The packet length update section 54*b* outputs the PES header 140 which has the updated packet_length to a combining section 54*d* as the PES header 141.

Figure 2B:
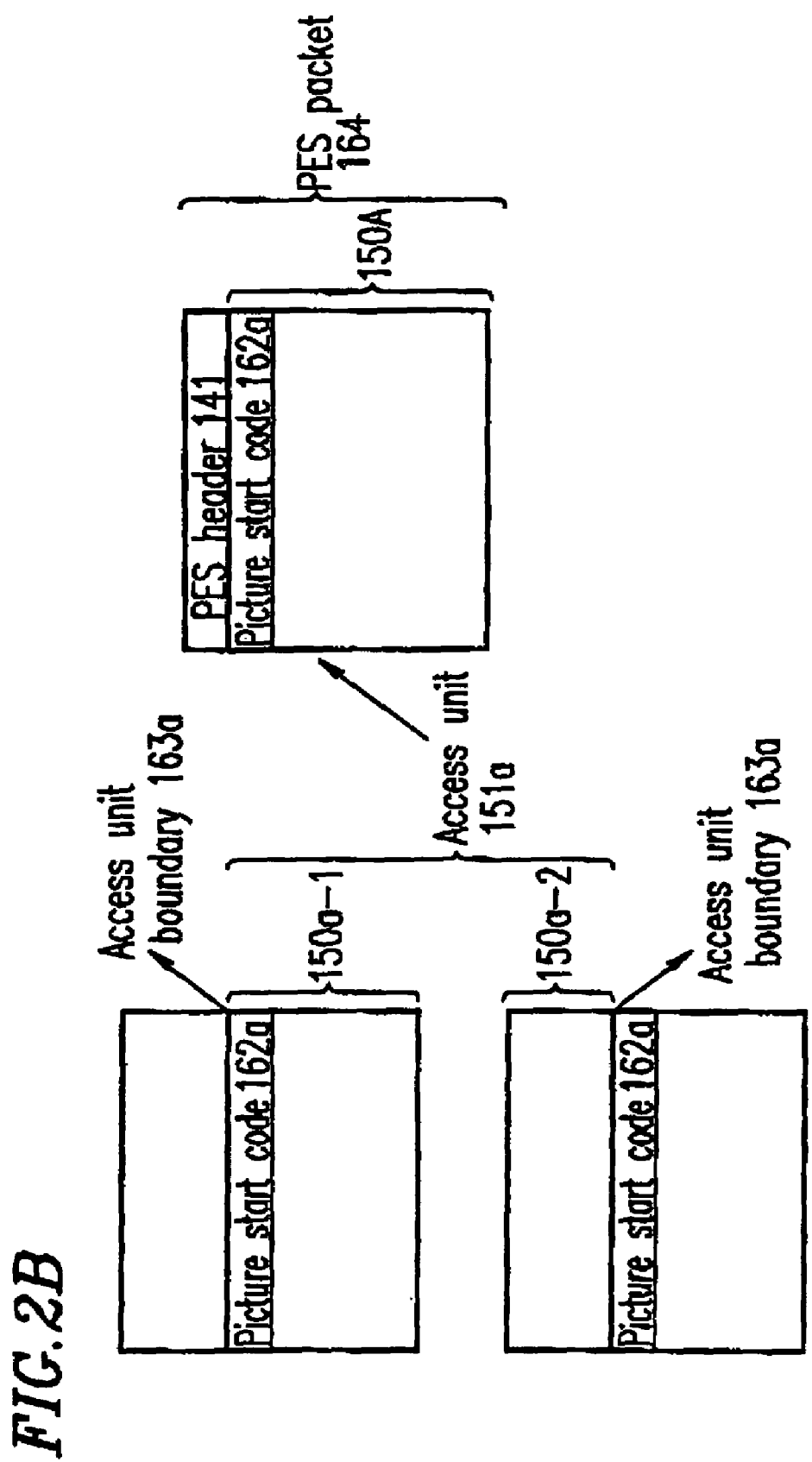
FIG. 2B is a diagram showing how a PES packet 164 is generated.

The PES packet generation section 54 additionally receives the video data 150*a* which starts from the picture start code 162*a*. The video data 150*a* is stored in the buffer 54*a*. Herein, as shown in FIG. 2B, when a portion of the video data 150*a* (a first data portion 150*a*-1) is included in the data portion 150 of a first packet 130 and another portion of the video data 150*a* (a second data portion 150*a*-2) is included in the data portion 150 of a second packet 130 following the first packet, the first data portion 150*a*-1 and the second data portion 150*a*-2 are stored in the buffer 54*a*, and the first data portion 150*a*-1 and the second data portion 150*a*-2 are combined together in the buffer 54*c*. As a result, the video data 150A corresponding to one access unit 151*a* is output from the buffer 54*c* to the combining section 54*d*.

The combining section 54*d* receives the PES header 141 from the packet length update section 54*b*, receives the video data 150A corresponding to the access unit 151*a* from the buffer 54*d*, and combines the PES header 141 and the video data 150A. Thus, a new PES packet 164 including the video data 150A corresponding to the access unit 151*a* is generated. The PES packet 164 is output to the data storage section 20.

Herein, the PES header 141 which is to be combined to the video data 150A corresponding to the access unit 161*a* is obtained by updating packet_length of the last one of a plurality of PES headers 140 which appeared prior to the first data portion 150*a*-1 including the picture start code 162*a*.

The information included in the PES header 141 can be same as the information included in the PES header 140. However, it is sufficient that the PES header 141 includes a portion of the information included in the PES header 140 because the PES header 140 includes information not necessarily needed for the PES header 141.

For example, from a viewpoint of implementing a special reproduction operation, it is enough for the PES header 141 to include the packet_length. This is because, with reference to the packet_length value in the PES header 141, the data length of the access unit 151*a* including the picture start code 162*a* can be obtained, and the special reproduction operation can be performed by using this data length. Such a process is executed by the read control section 30 which will be described later. Moreover, it is preferable that the PES header 141 further includes pack_start_code_prefix, stream_id and the PTS. Alternatively, the PTS can be inserted into a predetermined position of the video data 150A.

The packet length update section 54*b* can be structured to select information which is needed for the PES header 141 from the information included in the PES header 140, and to output the PES header 141 including the selected information. The information selected by the packet length update section 54*b* can be predetermined information included in the PES header 140, or can be information selected according to the data following the PES header 140 in the information included in the PES header 140.

By repeating the operation described above, the PES packet generation section 54 generates a plurality of new PES packets 164. Each of the plurality of PES packets 164 includes video data corresponding to one access unit.

Figure 7:
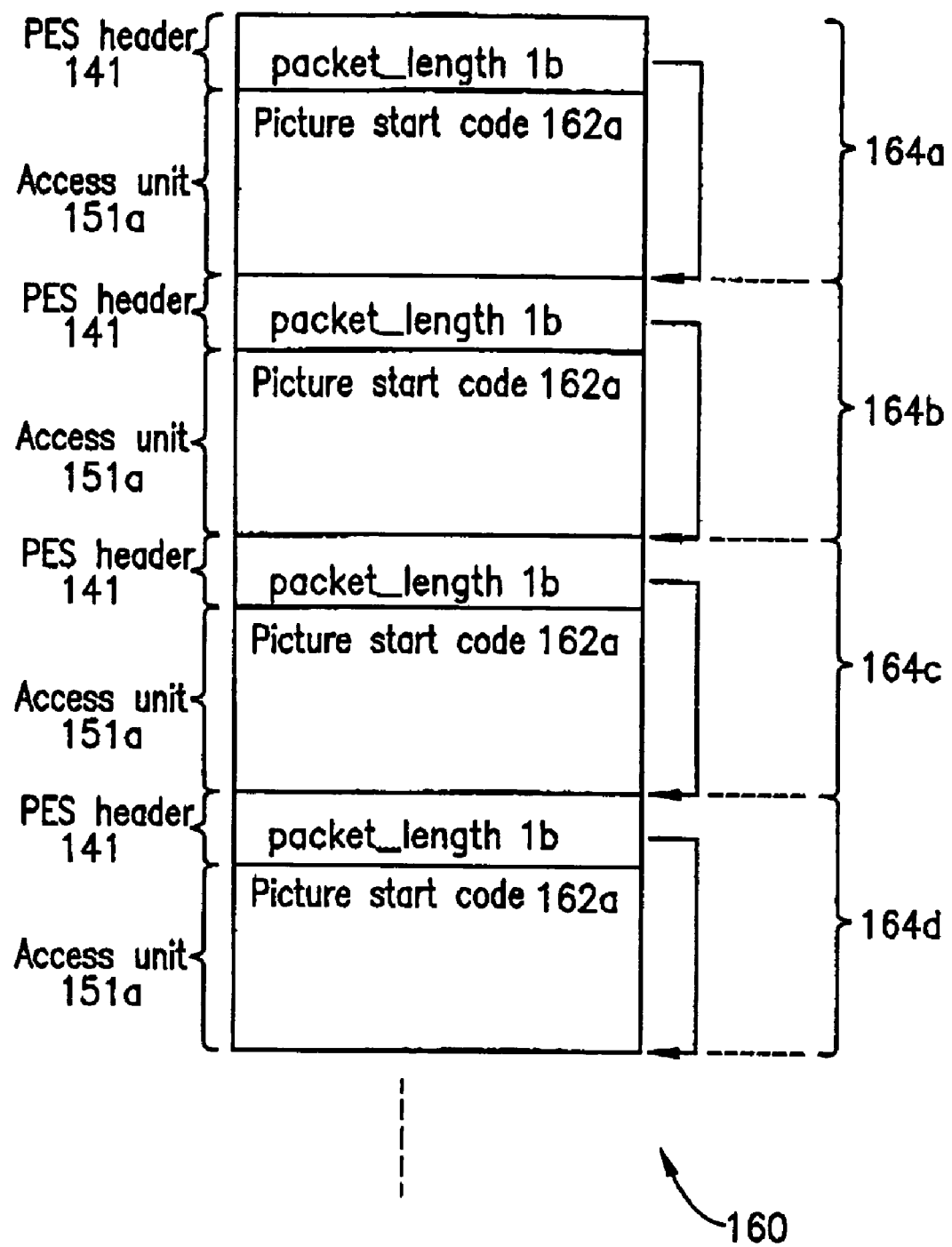
FIG. 7 illustrates an example of a bit stream 160 including PES packets 164a–164d generated by a PES packet generation section 54.

FIG. 7 illustrates an example of the bit stream 160 including PES packets 164*a*–164*d* generated by the PES packet generation section 54.

The PES packet generation section 54 can generate the PES packet 164 including audio data corresponding to one access unit, similar to the case of video data described above.

Addition of other information to the PES header 140 will not be a problem even though it is out of the range of the MPEG2 system stream standard, if there are appropriate guidelines related to the handling of the other information between the decoding section 40 and the PES header 140.

Hereinafter, a structure and operation of the read control section 30 included in the decoding device 1 will be described.

Figure 5:
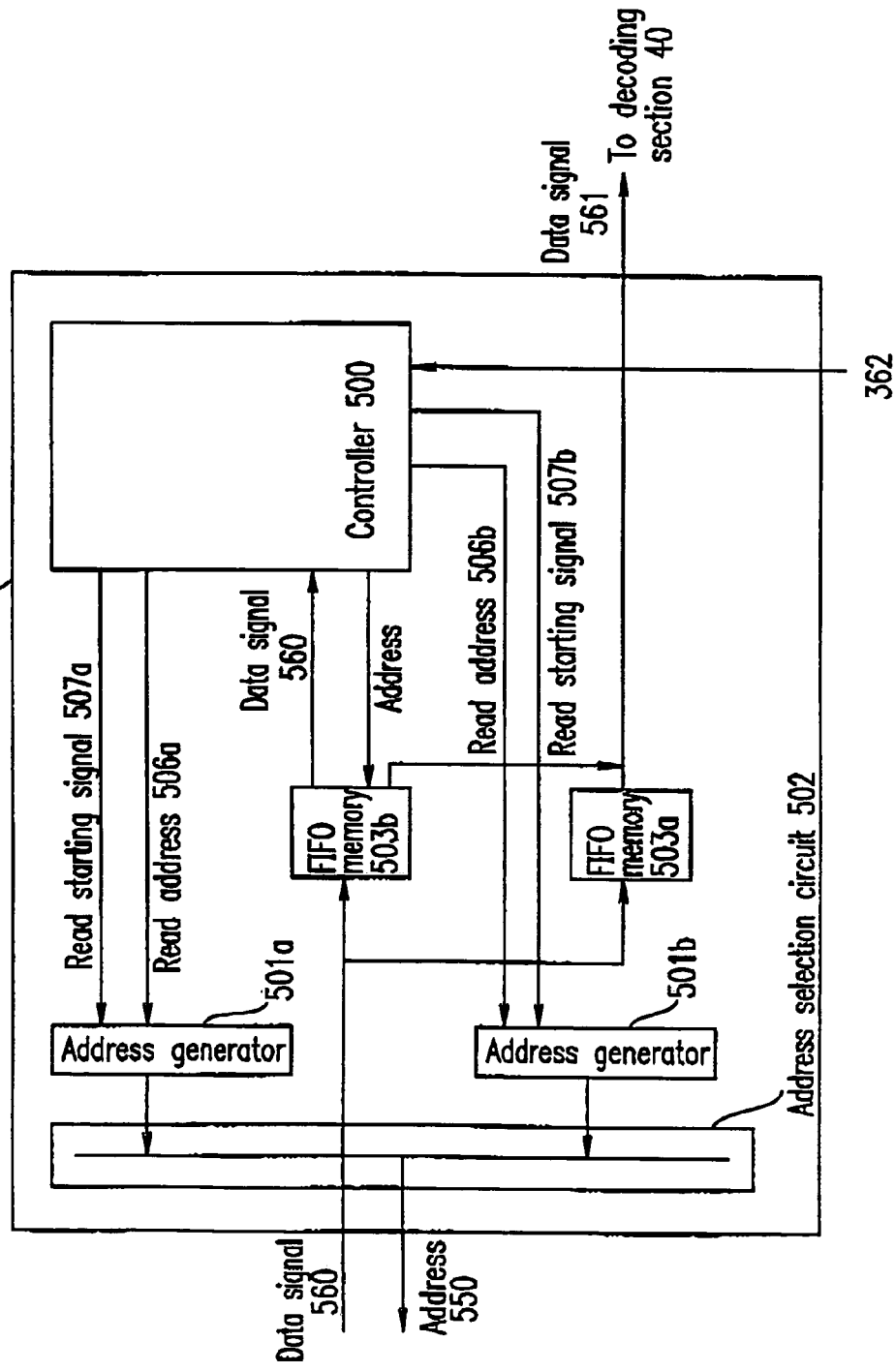
FIG. 5 illustrates a structure of a read control section 30.

FIG. 5 illustrates the structure of the read control section 30.

The read control section 30 includes a controller 500, address generators 501*a* and 501*b*, an address selection circuit 502, and FIFO (first-in first-out) memories 503*a* and 503*b*.

A control signal 362 indicating a reproduction operating mode is input to the controller 500. The controller 500 controls are production of the bitstream 100 according to the control signal 362. The operation of the read control section 30 when the reproduction operating mode is a normal reproduction mode, and the operation of the read control section 30 when the reproduction operating mode is a double speed reproduction mode or a freeze reproduction mode will be described later.

When the reproduction operating mode is the normal reproduction mode, the controller 500 sets a read address 506*a* in the address generator 501*a* and outputs a read starting signal 507*a* to the address generator 501*a*.

The address generator 501*a* commands the data storage section 20 to read the bit stream 160 starting from the set read address 506*a*. The read address and a read instruction of the bit stream 160 are output to the data storage section 20 via the address selection circuit 502 as the address 550.

The data signal 560 is transmitted from the data storage section 20 based on the read address and the read instruction of the bit stream 160. The data signal 5601*s* stored in the FIFO memory 503*a*. When taking the address of the data storage section 20 indicated by the read address 506*a* as an initial value, the data signal 560 is a signal representing the data stored in the addresses corresponding to the initial value and subsequent values. When a predetermined amount of the data signal 560 is stored in the FIFO memory 503a, the stored data signal 560 is output to the decoding section 40 as the data signal 561. The data signal 561 is substantially the same as the data signal 560. Thus, the operation of the normal reproduction mode is executed.

In the case where the operation mode is the double speed reproduction mode or the freeze reproduction mode, the operation of the read control section 30 is similar to the operation of the read control section 30 in the normal operation mode up to a point where the data signal 560 is transmitted from the data storage section 20. That is, unlike the normal reproduction mode, the double speed reproduction mode and the freeze reproduction mode use the address generator 501b, instead of the address generator 501a, and the read address 506b and the read starting signal 507b, instead of the read address 506a and the read starting signal 507a, respectively.

The data signal 560 transmitted from the data storage section 201s stored in the FIFO memory 503b. When taking the address of the data storage section 20 indicated by the read address 506b as an initial value, the data signal 560 is a signal representing the data stored in the addresses corresponding to the initial value and subsequent values.

The data signal 560 stored in the FIFO memory 503b is read by the controller 500. The data signal 560 is the bit stream 160 and includes at least one PES packet 164. (In FIG. 7, the PES packets are indicated with reference numerals 164a–164d.) The controller 500 reads the data length of the access unit 151a by analyzing the PES packet 164 and referring to the packet_length value included in the PES header 141 of the PES packet 164. The controller 500 outputs addresses of every other PES packet 164 (for example, 164a and 164c in FIG. 7) for the double speed reproduction mode, or repeatedly outputs the address of one PES packet 164 (for example, 164a in FIG. 7) for the freeze reproduction mode, to the address generator 501b as the read address 506b based on the data length of the read access unit 151a. In other words, the process is performed to skip every other PES packet 164 for the double speed reproduction mode, and to read the same PES packet 164 repeatedly for the freeze reproduction mode. Then, the data signal 560 of the address corresponding to the read address 506b and subsequent addresses is read from the data storage section 20 and stored in the FIFO memory 503a. The data signal 560 stored in the FIFO memory 503a is output to the decoding section 40 when the signal reaches a predetermined level.

According to the double speed reproduction operation of the read control section 30 described above, by referring only to the packet_length value, a skip operation of the PES packets 164 (for example, 164b and 164d in FIG. 7) can be implemented. Therefore, a smooth, high-speed reproduction can be implemented.

According to the freeze reproduction operation of the read control section 30 described above, at least one of the plurality of PES packets 164 generated to include the data corresponding to the access unit is repeatedly decoded. Unlike the case of a conventional device, according to the present invention, the data which has been decoded is not repeatedly displayed, so that a buffer memory for storing the data which has been decoded is not needed.

It is assumed that the controller 500 again outputs the read address to the address generator 501b based on the data length of the read access unit 151a. However, the controller 500 may directly read the corresponding PES packet 164 stored in the FIFO memory 503b based on the data length of the read access unit 151a. In this case, the controller 500 outputs a signal indicating which address in the FIFO memory 503b of the PES packet 164 to be read to the FIFO memory 503b. The FIFO memory 503b which has received the signal indicating the address outputs the data signal 561 including the corresponding PES packets 164 of the address and subsequent addresses to the decoding section 40. This structure is particularly useful for the freeze reproduction operation where one PES packet 164 is repeatedly reproduced.

In the case where the control signal 362 indicates a "triple speed reproduction mode", triple speed reproduction can be implemented by skipping PES packets corresponding to two access units in series and then reproducing PES packets corresponding to one access unit by an operation similar to the operation described above.

Moreover, there may be a case where the control read section 30 cannot perform a skip operation due to a coding scheme, which is based on a forward motion prediction and backward motion prediction which are specific to the MPEG standard. For example, in an image including "I/P/B/B/P/B/B/P - - - ", only B can be skipped. This operation can easily be implemented by checking a picture coding type following the picture start code 162a.

There is no particular limitation on the operation of skipping the PES packets for the audio data.

The FIFO memories 503a and 503b are used in this embodiment for an efficient use of a signal line between the read control section 30 and the decoding section 40. This is due to a fact that a signal is transmitted relatively slowly between the read control section 30 and the decoding section 40 while a signal can be transmitted quickly between the read control section 30 and the data storage section 20. By providing the FIFO memories 503a and 503b and starting the transmission when the stored data reaches a predetermined amount, a signal line having a relatively slow transmission speed can be efficiently used.

INDUSTRIAL APPLICABILITY

According to the present invention, a new packet including data corresponding to an access unit is generated by a packet regeneration section. The new packet includes information indicating a data length corresponding to the access unit. A leading portion of an access unit is easily specified by referring to the information indicating the data length corresponding to the access unit. Unlike the case of a conventional device, according to the present invention, it is not necessary to search a data portion of the packet in order to specify an access unit. Thus, a fast skip reproduction operation can be implemented.

According to the present invention, a freeze reproduction operation is implemented by repeatedly decoding at least one of a plurality of new packets generated to include data corresponding to the access unit. Thus, a buffer memory to store the data which has been decoded is not necessary. As a result, system cost is reduced.

What is claimed is:

1. A decoding device for decoding a bit stream including a plurality of packets, in which data corresponding to an access unit includes a first data portion and a second data portion, the decoding device comprising:
   a packet regeneration section for receiving the bit stream including the plurality of packets, and producing a plurality of new packets from the received bit stream;
   a storage section for storing the plurality of new packets produced by the packet regeneration section;
   a read control section for receiving a control signal indicating a reproduction operation mode for the bit stream, producing an address signal according to the reproduction operation mode which is indicated by the control signal, outputting the produce address signal to the storage section, and reading, according to the address signal, the plurality of packets data which are stored in the storage section; and a combining section for decoding the read signal at the read control section;

wherein the packet regeneration section, in the case where one access unit which is a minimum data unit is decodable individually, has the first data portion included in the first packet of the bit stream and the second data portion included in the second packet following the first packet, combines the first data portion and the second data portion, and produces a new packet including information indicating a length of the data corresponding to the access unit; and wherein the read control section, in the case where the control signal indicates a skip regeneration operation mode, by using information indicating a length of the data corresponding to the access unit, reads the plurality of new packets from the storage section so as to skip at least one of the plurality of new packets.

2. A decoding device according to claim 1, wherein the new packet further includes information indicating a presentation time stamp.

3. A decoding device for decoding a bit stream including a plurality of packets, in which date corresponding to an access unit includes a first data portion and a second data portion, the decoding device comprising:

a packet regeneration section for receiving the bit stream including the plurality of packets, and producing a plurality of new packets from the received bit stream;

a storage section for storing the plurality of new packets produced by the packet regeneration section;

a read control section for receiving a control signal indicating a reproduction operation mode for the bit stream, producing an address signal according to the reproduction operation mode which is indicated by the control signal, outputting the produce address signal to the storage section, and reading, according to the address signal, the plurality of packets data which are stored in the storage section; and a combining section for decoding the read signal at the read control section;

wherein the packet regeneration section, in the case where one access unit which is a minimum data unit is decodable individually, has the first data portion included in the first packet of the bit stream and the second data portion included in the second packet following the first packet, combines the first data portion and the second data portion, and produces a new packet including information indicating a length of the data corresponding to the access unit; and wherein the read control section, in the case where the control signal indicates a freeze regeneration operation mode, by using information indicating a length of the data corresponding to the access unit, repeatedly reads at least one of the plurality of new packets from the storage section.

4. A decoding method for decoding a bit stream including a plurality of packets, in which data corresponding to an access unit includes a first data portion and a second data portion, the decoding method comprising the steps of:

a packet regeneration step for receiving the bit stream including the plurality of packets, and producing a plurality of new packets from the received bit stream;

a storage step for storing the plurality of new packets produced by the packet regeneration step;

a reading step for producing an address signal according to a control signal indicating a reproduction operation mode for the bit stream, and reading, according to the produced address signal, the plurality of packets data which has been stored in the storage step; and a decoding step for decoding the data read on the reading step;

wherein the packet regeneration step, in the case where one access unit which is a minimum data unit is decodable individually, has the first data portion included in the first packet of the bit stream and the second data portion included in the second packet following the first packet, combines the first data portion and the second data portion, and produces a new packet including information indicating a length of the data corresponding to the access unit; and wherein the read control step, in the case where the control signal indicates a skip regeneration operation mode, by using information indicating a length of the data corresponding to the access unit, reads the plurality of new packets from the storage step so as to skip at least one of the plurality of new packets.

5. A decoding method for decoding a bit stream including a plurality of packets, in which data corresponding to an access unit includes a first data portion and a second data portion, the decoding method comprising the steps of;

a packet regeneration step for receiving the bit stream including the plurality of packets, and producing a plurality of new packets from the received bit stream;

a storage step for storing the plurality of new packets produced by the packet regeneration step;

a reading step for producing an address signal according to a control signal indicating a reproduction operation mode for the bit stream, and reading, according to the produced address signal, the plurality of packets data which has been stored in the storage step; and a decoding step for decoding the data read on the reading step, wherein the packet regeneration step, in the case where one access unit which is a minimum data unit is decodable individually, has the first data portion included in the first packet of the bit stream and the second data portion included in the second packet following the first packet, combines the first data portion and the second data portion, and produces a new packet including information indicating a length of the data corresponding to the access unit; and wherein the reading step, in the case where the control signal indicates a freeze regeneration operation mode, by using information indicating a length of the data corresponding to the access unit, repeatedly reads at least one of the plurality of new packets from the storage step.

6. A decoding device according to claim 3, wherein the new packet further includes information indicating a presentation time stamp.

* * * * *